（12）United States Patent
Brown et al.

(10) Patent No.: US 10,821,416 B2
(45) Date of Patent: Nov. 3, 2020

(54) SECTIONALIZED BOX STYLE STEAM METHANE REFORMER

(71) Applicant: EXTIEL HOLDINGS, LLC, Dallas, TX (US)

(72) Inventors: Tom Brown, Tyler, TX (US); Greg Carr, Kingwood, TX (US); Cuong Nguyen, Houston, TX (US); Michael O'Brien, Houston, TX (US)

( * ) Notice: Subject to any disclaimer, the term of this patent is extended or adjusted under 35 U.S.C. 154(b) by 0 days.

(21) Appl. No.: 16/472,145

(22) PCT Filed: Dec. 21, 2017

(86) PCT No.: PCT/US2017/067783
§ 371 (c)(1),
(2) Date: Jun. 20, 2019

(87) PCT Pub. No.: WO2018/119172
PCT Pub. Date: Jun. 28, 2018

(65) Prior Publication Data
US 2019/0321800 A1 Oct. 24, 2019

Related U.S. Application Data

(63) Continuation of application No. 15/847,053, filed on Dec. 19, 2017, now abandoned.
(Continued)

(51) Int. Cl.
*B01J 12/00* (2006.01)
*B01J 19/24* (2006.01)
(Continued)

(52) U.S. Cl.
CPC ....... *B01J 19/2425* (2013.01); *B01J 19/0013* (2013.01); *B01J 19/249* (2013.01);
(Continued)

(58) Field of Classification Search
CPC ............... B01J 19/2425; B01J 19/0013; B01J 2219/00157; B01J 2219/0015; B01J 12/00;
(Continued)

(56) References Cited

U.S. PATENT DOCUMENTS 3,607,125 A 9/1971 Kydd
6,277,894 B1 * 8/2001 Agee ...................... C01B 3/382
518/700
(Continued)

*Primary Examiner* — Huy Tram Nguyen
(74) *Attorney, Agent, or Firm* — Brian K. Yost; Decker Jones, PC

(57) ABSTRACT

A box style steam methane reformer (15) has plural sections (37), with each section having walls (27-29-31, 33) forming an interior cavity (35) and open ends (43) that communicate with the interior cavity. Each section has a feedstock supply pipe (71) and a fuel supply pipe (63) located along the top wall, as well as a syngas collection pipe (79) and a flue gas collection duct (75) located outside of the bottom wall. The pipes and ducts have ends that are aligned with each other to allow the sections to be assembled together. Burners (67) are in the interior cavity and are connected to the fuel supply pipe. Reactor tubes (59) extend through the interior cavity. Refractory members (81) are located in the interior cavity and across a slot. The spacing between the refractory members varies to control the flow of flue gas.

22 Claims, 9 Drawing Sheets

Related U.S. Application Data

(60) Provisional application No. 62/438,151, filed on Dec. 22, 2016.

(51) Int. Cl.
  *B01J 8/06* (2006.01)
  *C01B 3/38* (2006.01)
  *B01J 19/00* (2006.01)

(52) U.S. Cl.
  CPC ............... *C01B 3/38* (2013.01); *C01B 3/384* (2013.01); *B01J 2219/0002* (2013.01); *B01J 2219/0015* (2013.01); *B01J 2219/00022* (2013.01); *B01J 2219/00157* (2013.01); *B01J 2219/1923* (2013.01); *B01J 2219/24* (2013.01); *C01B 2203/0233* (2013.01); *C01B 2203/0811* (2013.01); *C01B 2203/0816* (2013.01); *C01B 2203/0894* (2013.01); *C01B 2203/1058* (2013.01); *C01B 2203/1241* (2013.01); *C01B 2203/141* (2013.01)

(58) Field of Classification Search
  CPC ... B01J 19/24; B01J 8/06; B01J 12/007; B01J 19/2415; C01B 3/384; C01B 2203/141; C01B 2203/0233; C01B 2203/1241; C01B 2203/0816
  USPC .......................................................... 422/629
  See application file for complete search history.

(56) References Cited

U.S. PATENT DOCUMENTS

| | | | |
|---|---|---|---|
| 6,767,376 | B1 | 7/2004 | Perna et al. |
| 6,793,700 | B2 | 9/2004 | Pham et al. |
| 6,818,028 | B2 | 11/2004 | Barnett et al. |
| 8,021,633 | B2 | 9/2011 | Bowe et al. |
| 2006/0104896 | A1 | 5/2006 | Drnevich et al. |
| 2006/0248800 | A1 | 11/2006 | Miglin et al. |
| 2007/0289215 | A1 | 12/2007 | Hemmings et al. |
| 2009/0301309 | A1* | 12/2009 | Pereira .................. C01B 3/384 96/201 |
| 2011/0142722 | A1* | 6/2011 | Hemmings .......... B01D 53/228 422/149 |
| 2013/0009100 | A1 | 1/2013 | Kelly et al. |

* cited by examiner

SECTIONALIZED BOX STYLE STEAM METHANE REFORMER

FIELD OF THE INVENTION

The present invention relates to steam methane reformers, including, the fabrication, transportation and installation thereof.

BACKGROUND OF THE INVENTION

Steam methane reformers, or SMRs, are used in the gas-to-liquids industry, as well as to produce hydrogen for various processes that require a hydrogen feed. In steam methane reforming, steam and methane are reacted together in the presence of a catalyst, under appropriate temperature and pressure conditions, to produce synthesis gas, or syngas. The two gases produced by this process are carbon monoxide (CO) and hydrogen ($H_2$). The catalyst is typically a nickel catalyst.

Syngas is used in a Fischer-Tropsch process to produce hydrocarbons such as gasoline, diesel, oils, paraffins, etc. In a Fischer-Tropsch process, syngas is contacted with a Fischer-Tropsch catalyst under appropriate temperature and pressure conditions to produce the hydrocarbons. By selecting the catalyst and the operating conditions, the desired hydrocarbons can be produced.

There are several types of steam methane reformers. One type is designed for fuel cells and is typically small in size and output. An example is a plate type reformer. Such plate type reformers are not suitable for producing the volume of syngas for a commercial Fischer-Tropsch process, where the products are sold.

The reforming process to produce syngas is highly endothermic. Therefore, a heat source is provided. A typical steam methane reformer has a furnace equipped with interior burners. Inside the furnace are tubes containing the catalyst. Steam and methane are directed into one end of the tubes, with syngas exiting the other end of the tubes.

It is very difficult to obtain the necessary permits to build a chemical plant close to a city or town. Even if the necessary permits are acquired, neighboring entities engage in lawsuits and other tactics to prevent the building of such a chemical plant. As a result, chemical plants, such as a steam methane reformer and associated Fischer-Tropsch reactor, are located at sites remote from cities, towns and other population centers. This leads to difficulties in fabricating the plants.

Steam methane reformers are currently fabricated in one of two ways, namely small and large.

A small steam methane reformer is a self-contained, complete unit having a round vessel, which typically contains anywhere from 4 to 40 reactor tubes. The units are fabricated in a shop and transported to the chemical plant location. The size of these units is limited by shipping constraints. Due to fabrication constraints, the burners in these round units are located at the bottom of the vessel and once in operation, fire upwards. This means that the reactor tubes receive radiant heat only on the inward facing side. As a result, these units are not the most thermally efficient design and more fuel is required to produce a unit of syngas than with more efficient reformers. Furthermore, due to the small size of the reformer, the capacity is severely limited. While multiple round steam methane reformers can be employed to achieve greater capacity, due to the complexity of the associated ductwork and required heat recovery equipment, most chemical plant sites are limited to a configuration of two round vessels.

In many cases, the requirement for syngas is much greater than the capacity of one or two small round reactors. For these larger applications, a box style reformer is used. The furnace is in the shape of a box. A typical box style reformer contains hundreds of tubes and, as a result, generates large amounts of syngas. The burners are typically top mounted and fire downwards. The reactor tubes are arranged in rows with burners on both sides allowing for radiant heating of the entire tube, not just one side as with the round units. Consequently, box reformers are much more efficient, requiring less fuel gas per unit of syngas produced. Due to their size, these units are largely field fabricated on site. Field fabrication entails welding the tubes, assembling the various components, all on site. The reactor tubes containing the catalyst are a special high nickel alloy requiring highly skilled welders with special certifications.

In addition to locating the plants remotely from population centers, the plants are scattered throughout the country and are not concentrated in one location. As a result, workers travel to the particular plant location and work, often for months at a time. Many workers quit working before the job is finished due to the remoteness of the plant location. Field fabrication, with its high field labor component and turnover, adds considerably to the cost of installation. Therefore the cost of building such a plant is very high, limiting the number of installations.

Many Fischer-Tropsch produced products are environmentally friendly and nonpolluting. However, current production of Fischer-Tropsch produced products is limited by the high cost of production. This is due to either the high installation costs of large steam methane reformers, or the thermal inefficiencies of the smaller units.

It is desired to provide a thermally efficient, less costly steam methane reformer.

SUMMARY OF THE INVENTION

The present invention provides a box style steam methane reformer section, comprising a top wall, a bottom wall, and side walls forming an interior cavity. The section has open ends that communicate with the interior cavity. At least one feedstock supply pipe is located along the top wall outside of the interior cavity, the feedstock supply pipe having feedstock supply pipe ends. At least one fuel supply pipe is located along the top wall outside of the interior cavity, the fuel supply pipe having fuel supply pipe ends. At least one syngas collection pipe is located outside of the bottom wall, the syngas collection pipe having syngas collection pipe ends. At least one flue gas collection duct is located outside of the bottom wall, the flue gas collection duct having flue gas collection duct ends. Reactor tubes are located in the interior cavity and extending from the bottom wall to the top wall, the reactor tubes having a top end connected to the feedstock supply pipe and a bottom end connected to the syngas collection pipe. Burners are located in the interior cavity adjacent to the top wall and are connected to the fuel supply pipe. The burners provide radiant heating of the reactor tubes. The feedstock supply pipe ends, the fuel supply pipe ends, the syngas collection pipe ends and the flue gas collection duct ends are aligned with each other and with the section ends so that when the steam methane reformer section is assembled to a second steam methane reformer section, the section ends, the feedstock supply pipe ends, the fuel supply pipe ends, the syngas collection pipe ends and the flue gas collection duct ends of the steam methane reformer section are coupled to the section ends, the feedstock supply pipe ends, the fuel supply pipe ends, the syngas collection pipe ends and the flue gas collection duct ends of the second steam methane reformer section.

In one aspect, the section further comprises flanges around the section ends.

In another aspect, the section further comprises flanges around the feedstock supply pipe ends, the fuel supply pipe ends, the syngas collection pipe ends and the flue gas collection duct ends.

In still another aspect, the section further comprises insulation inside the top wall, the bottom wall and the side walls.

In still another aspect, the section further comprises at least one slot in the bottom wall. The slot is aligned with the flue collection duct and allows the interior cavity to communicate with the flue gas collection duct. Plural refractory members are located in the interior cavity and across the slot. The refractor) members being separated from one another by gaps that allow the interior cavity to communicate with the flue gas, collection duct.

In still another aspect, the size of the gaps varies along a length of the slot from section end to section end.

In still another aspect, legs support the bottom wall off of the ground.

In still another aspect, the section further comprises flanges around the section ends, and flanges around the feedstock supply pipe ends, the fuel supply pipe ends, the syngas collection pipe ends and the flue gas collection duct ends. Insulation is inside the top wall, the bottom wall and the side walls. At least one slot is in the bottom wall, the slot aligned with the flue gas collection duct. Plural refractory members are located in the interior cavity and across the slot, the refractory members being separated from one another by gaps that allow the interior cavity to communicate with the flue collection duct. The size of the gaps varies along a length of the slot from section end to section end. Legs support the bottom wall off of the ground.

The present invention also provides a box style steam methane reformer, comprising plural sections. Each section comprises a top wall, a bottom wall, and side walls forming an interior cavity. The respective section has open ends that communicate with the interior cavity. At least one feedstock supply pipe is located along the top wall outside of the interior cavity, the feedstock supply pipe having feedstock supply pipe ends. At least one fuel supply pipe is located along the top wall outside of the interior cavity, the fuel supply pipe having fuel supply pipe ends. At least one syngas collection pipe is located outside of the bottom wall, the syngas collection pipe having syngas collection pipe ends. At least one flue gas collection duct is located outside of the bottom wall, the flue gas collection duct having flue gas collection duct ends. Reactor tubes are located in the interior cavity and extend from the bottom wall to the top wall. The reactor tubes have a top end connected to the feedstock supply pipe and a bottom end connected to the syngas collection pipe. Burners are located in the interior cavity adjacent to the top wall and are connected to the fuel supply pipe. The burners provide radiant heating of the reactor tubes. One of the ends of a first section coupled to one of the ends of a second section so as to form a continuous interior cavity between the first and second sections, with one of the feedstock supply pipe ends of the first section being coupled to the one of the feedstock supply pipe ends of the second section, one of the fuel supply pipe ends of the first section being coupled to the one of the fuel supply pipe ends of the second section, one of the syngas collection pipe ends of the first section being coupled to the one of the syngas collection pipe ends of the second section, one of the flue gas collection duct ends of the first section being coupled to one of the flue gas collection duct ends of the second section.

In accordance with one aspect, flanges are around each of the ends of the first and second sections.

In accordance with another aspect, flanges are around the feedstock supply pipe ends of each of the first and second sections, the fuel supply pipe ends of each of the first and second sections, the syngas collection pipe ends of each of the first and second sections and the flue gas collection duct ends of each of the first and second sections.

In accordance with another aspect, insulation is inside the top wall, the bottom wall and the side walls of each of the first and second sections.

In accordance with another aspect for each of the first and second sections, there is at least one slot in the bottom wall, the slot being aligned with the flue gas collection duct. Plural refractory members are located in the interior cavity and across the slot, the refractory members being separated from one another by gaps that allow the interior cavity to communicate with the flue collection duct.

In accordance with another aspect, the size of the gaps varies along a length of the slot from section end to section end.

In accordance with another aspect, legs support the bottom wall off of the ground.

In accordance with another aspect, two of the sections form ends of the reformer, further comprising end sections coupled to the reformer ends, the end sections closing the interior cavity of the sections.

In accordance with another aspect, flanges are around each of the ends of the first and second sections. Flanges are around the feedstock supply pipe ends of each of the first and second sections, the fuel supply pipe ends of each of the first and second sections, the syngas collection pipe ends of each of the first and second sections and the flue gas collection duct ends of each of the first and second sections. Insulation is inside the top wall, the bottom wall and the side walls of each of the first and second sections. For each of the first and second sections, at least one slot in the bottom wall. The slot is aligned with the flue gas collection duct. For each of the first and second sections, plural refractory members are located in the interior cavity and across the slot. The refractory members located across the slot being separated from one another by gaps that allow the interior cavity to communicate with the flue gas collection duct. For each of the first and second sections, the size of the gaps varies along a length of the slot from section end to section end. Legs support the bottom wall off of the ground.

The present invention also provides a box style steam methane reformer, comprising a top wall, a bottom wall, and side walls forming an interior cavity. At least one feedstock supply pipe is located along the top wall outside of the interior cavity. At least one fuel supply pipe is located along the top wall outside of the interior cavity. At least one syngas collection pipe is located outside of the bottom wall. At least one flue gas collection duct is located outside of the bottom wall. Burners are located in the interior cavity adjacent to the top wall and are connected to the fuel supply pipe. The burners provide radiant heating of the reactor tubes. Reactor tubes are located in the interior cavity, the reactor tubes being connected to the feedstock supply pipe, the reactor tubes each having a bottom end connected to the syngas collection pipe, the bottom ends of the reactor tubes being supported by the syngas collection pipe, the reactor tubes passing through the top wall and expanding and contracting with respect to the top wall.

In accordance with one aspect, the reactor tubes each have a top end that is supported by a spring suspended from an overhead structure.

In accordance with another aspect, the top ends of two of the reactor tubes are supported by an overhead support that allows for differential expansion and contraction between the two reactor tubes.

The present invention also provides a box style steam methane reformer, comprising a top wall, a bottom wall, and side walls forming an interior cavity. At least one feedstock supply pipe is located along the top wall outside of the interior cavity. At least one fuel supply pipe is located along the top wall outside of the interior cavity. At least one syngas collection pipe is located outside of the bottom wall. At least one flue gas collection duct is located outside of the bottom wall. Burners are located in the interior cavity adjacent to the top wall and are connected to the fuel supply pipe. The burners provide radiant heating of the reactor tubes. Reactor tubes are located in the interior cavity, the reactor tubes being connected to the feedstock supply pipe, the reactor tubes each having a bottom end connected to the syngas collection pipe. At least one slot is in the bottom wall, the slot aligned with the flue gas collection duct. Plural refractory members are located in the interior cavity and across the slot. The refractory members located across the slot are separated from one another by gaps that allow the interior cavity to communicate with the flue collection duct.

In accordance with one aspect, the size of the gaps varies along a length of the slot from section end to section end.

DESCRIPTION OF THE PREFERRED EMBODIMENT

The sectionalized steam methane reformer of the present invention is fabricated in discrete sections at an off-site location, such as a manufacturing plant. Fabrication at such a facility can be accomplished using reasonably priced labor, as well as labor that is reliable and with a low turnover. In addition quality control is less expensive to maintain in a controlled environment, such as a manufacturing plant or fabrication shop. All of the technical welding to construct the framework, the walls, the burners, the exits for the flue gas, the piping, including the reactor tubes, as well as the instrumentation, is done at the fabrication shop. Welding of components in the high temperature portions of the reactor is of a specialized type and typically requires testing. All of the necessary inspections of the fabrication work are conducted at the fabrication shop. For example, x-ray inspections of the welds are carried out. Once the sections are fabricated and inspected, the sections are then shipped or transported to the plant site at a remote location. There, the sections are assembled together. Such assembly occurs with a minimal amount of workers. In addition, the workers performing the assembly need not be highly skilled and need not be as skilled as those workers who fabricated the sections. Assembly requires aligning the sections and bolting the sections together. Little or no welding is needed to assemble the sections. Any welding that may be required is in the lower temperature portions of the reactor, and does not require specialty welding and testing.

The sectionalized steam methane reformer has other advantages. The reformer design provides flexibility in that it can be sized to the particular project, including large reformers with over a thousand tubes. The reformer has reaction sections with burners arranged relative to the tubes in a thermally efficient manner, resulting in lower operation expenses. The reformer has reactor tubes supported from the bottom, with the top ends allowing for thermal expansion and contraction. Such an arrangement allows for ease of fabrication and installation.

In addition, maintenance is reduced, particularly in the flue gas collection ducts. Prior art box style steam methane reformers utilize refractory brick to form ducts or tunnels to channel the flue gas out of the reformer. The tunnels are made of brick stacked on the bottom of the reformer, which brick forms vertical walls. A top layer of pre-cast refractory slabs closes off much of the top of the tunnel. Thermal cycling of the reformer causes the bricks to crack. After some period of operation, the reformer must be shut down to allow a crew to rebuild the ducts. The sectionalized steam methane reformer requires less maintenance, resulting in less down time.

Figure 1:
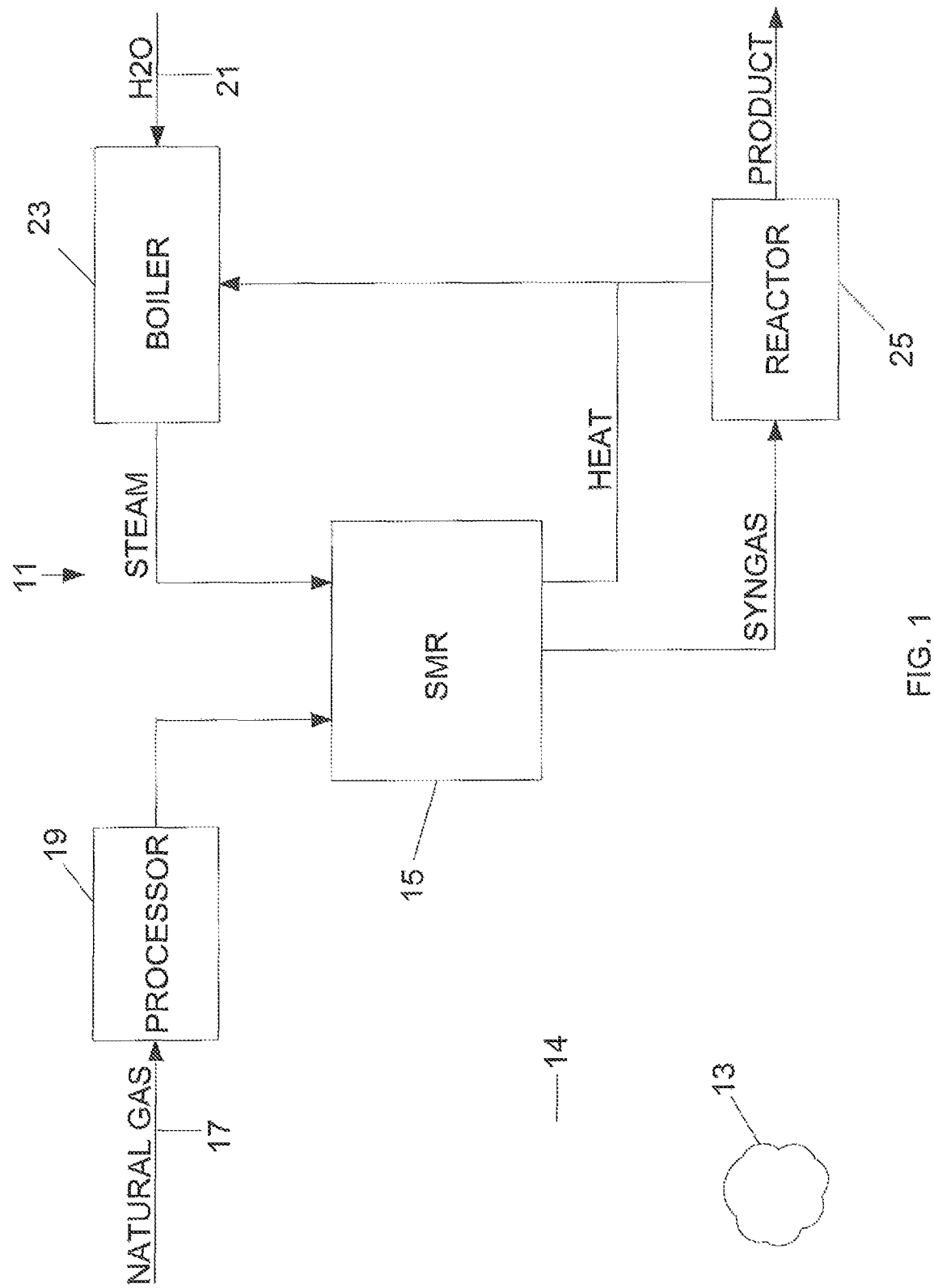
FIG. 1 is a view showing a remote location chemical plant, which includes a steam methane reformer.

Referring to FIG. 1, a chemical plant 11 is shown. The chemical plant is located remotely from cities, towns and other population centers 13. Typically, the plant is surrounded by undeveloped or rural areas 14, such as farmland, marsh, forest, etc. The chemical plant can be for a number of uses, but it includes a steam methane reformer 15. In addition, the plant includes equipment for the reformer.

The reformer 15 uses methane and steam. The methane is obtained from natural gas, which is delivered by way of a pipeline 17, The pipeline can deliver the natural gas from any number of sources, such as wells, underground storage facilities, etc. Natural gas is primarily methane and may contain contaminants which are not methane. Typically, the natural gas is processed in one or more processors 19 to remove contaminants. For example, the processor can involve a hydrogenation vessel which removes sulfur contaminants and forms $H_2S$ gas. The $H_2S$ is removed from the methane by a zinc oxide bed.

The plant also has a water supply 21 and a boiler 23 to make steam.

Some of the methane is provided with steam as feedstock to the reformer 15. The reformer contains a suitable catalyst, such as nickel-alumina. The catalyst is contained in a number of reactor tubes located inside of the reformer. The methane and steam are passed over the catalyst inside the tubes. The outside of the tubes are heated to provide the temperatures needed for the catalytic reaction. Typically, the heat is provided by burning natural gas. Some of the natural gas from the pipeline 17 is diverted to the burners for combustion. Syngas, hydrogen (H) and carbon monoxide (CO), is produced in the reactor tubes. The syngas may contain other components which can be removed from the stream by processing equipment. Also, the syngas ratio of H:CO may be adjusted as desired. The syngas is then provided to a reactor 25, which converts the syngas into a product, such as waxes, or other hydrocarbons. Waste heat from the reformer 15 is provided to the boiler 23. Likewise, any waste heat from the reactor 25 is also provided to the boiler.

Figure 2:
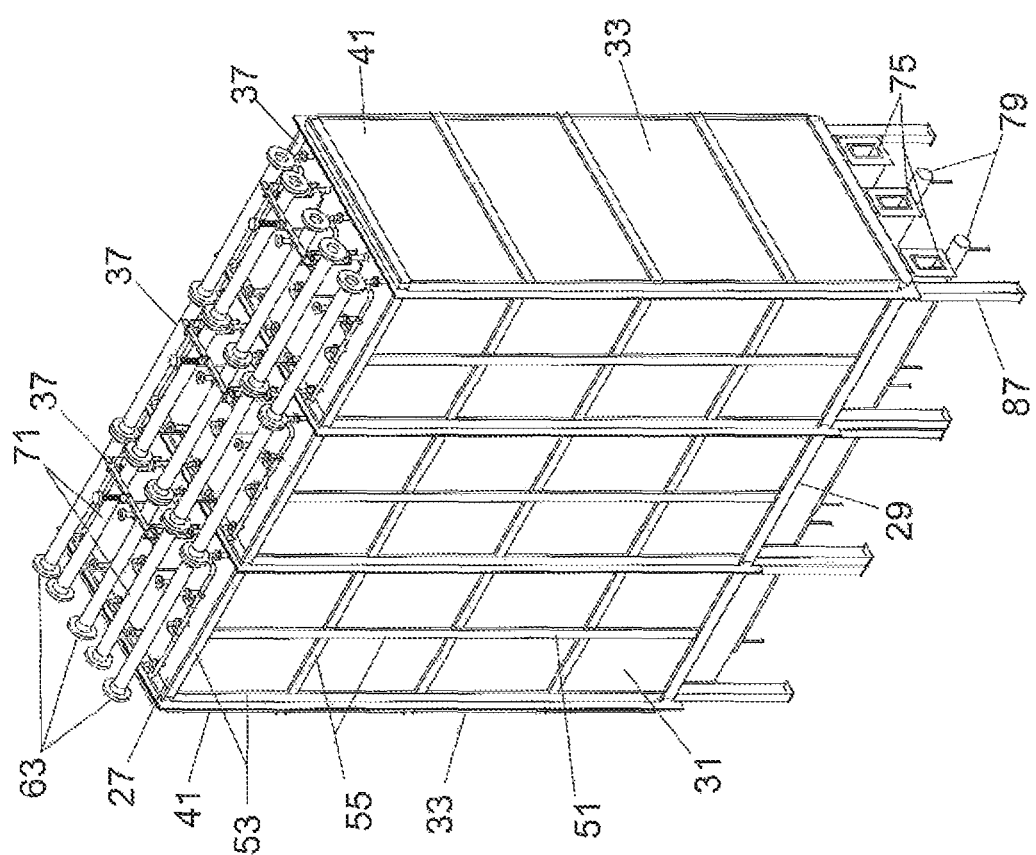
FIG. 2 is a perspective view of the assembled sectionalized box style steam methane reformer of the present invention, in accordance with a preferred embodiment.
Figure 3:
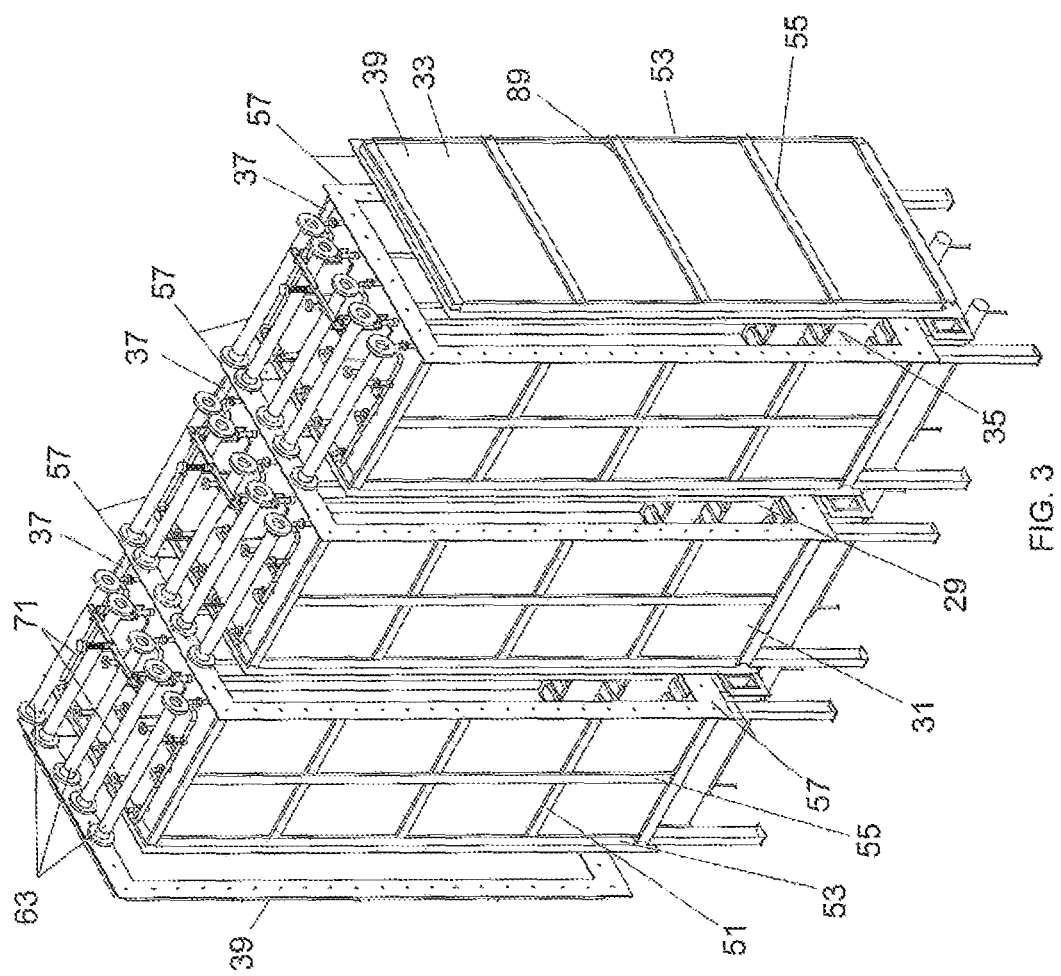
FIG. 3 is a perspective exploded view of the sectionalized box style steam methane reformer of FIG. 2.

The reformer 15 will now be discussed in more detail. Referring to FIGS. 2 and 3, the reformer is generally box-like in shape and structure. The reformer has walls, namely a top wall 27, a bottom wall 29, side walls 31 and end walls 33. The walls 27, 29, 31, 33 form an interior space or cavity 35.

In general, the flow of feedstock (methane and steam) into the reformer 15 and syngas out of the reformer is in a vertical direction, from up to down. The heat inside the reformer flows in the same direction, with the burners at the top and the flue gas exiting out of the bottom. Pipes 63, 71 convey the fuel for the burners and the feedstock or methane and steam and are located along the top wall 27. The pipes connect to manifolds, also located along the top wall. Below the bottom wall 29 are outlet ducts 75 for the flue gas and a manifold 79 for the syngas.

The sectionalized reformer has two types of sections, namely a reactor section 37 and an end section 39. FIG. 2 illustrates an assembled view of the reformer 15 and FIG. 3 illustrates an exploded view of the reformer. From left to right, the reformer has an end section 39, plural reactor sections 37 and another end section 39. In the example of FIGS. 2 and 3, three reactor sections 37 are shown, although more or fewer could be used. The individual sections 37, 39 will be discussed in turn.

Figure 4:
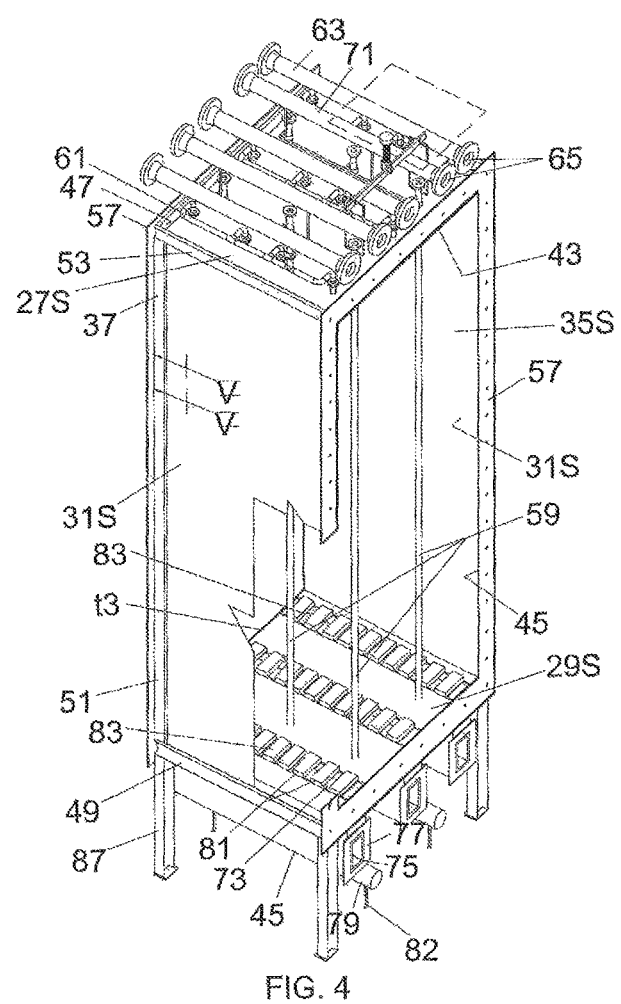
FIG. 4 is a perspective view of the reactor section of the steam methane reformer.

The reactor section 37 is shown in FIGS. 2-4. The reactor, section has a top wall 27S, a bottom wall 29S, and side walls 31S. The reactor section also has ends 43. The ends 43 are both open. The top, bottom and side walls 27S, 29S, 31S form an interior cavity 35S. The walls are connected to a framework, which is a top frame 47, a bottom frame 49 and side frames 51 (in the figures, the frames are partially shown). The frames are made up of structural steel members such as angle pieces or I-beams. For example, the side frame 51 (see FIG. 2) has edge members 53, which may be I-beams. There are top edge members and end edge members, coupled together in a rectangular arrangement. In addition, there are inner members 55 that form cross pieces between the edge members. The inner members are welded to the edge members. The side wall 31S is welded to the side frame 51 such that the top edge members extend along the top edges of the side wall and the end edge members extend along the end edges of the side wall. The top and bottom frames 47, 49 are similarly constructed, with edge members and inner members. The frames have a sufficient number and placement of inner members to provide structural stability and integrity. The side edges of the top wall 27S are welded to the top edges of the side walls 31S. The side edges of the bottom wall are welded to the bottom edges of the side walls. The walls 27S, 29S, 31S thus form a gapless enclosure, although the ends 43 are open. The frames are also coupled together. The top frame 47 is coupled to the two side frames 51 and the bottom frame 47 is coupled to the two side frames. The top and each side frame may share an edge member. Likewise, the bottom and each side frame may share an edge member.

The open ends 43 are provided with flanges 57. The flanges extend perpendicularly out from the respective walls. There is a flange portion along each of the side wall 31S end edges, the top wall 27S end edges and the bottom wall 29S end edges. The flange portions form a continuous flange 57 that extends perpendicularly out from the respective walls and that extends around the circumference of the respective open end 43.

Although the size of the reactor section 37 can vary according to the specific requirements of the specific plant, all, of the reactor sections for a single steam methane reformer 15 are of the same size and dimensions and are sized so as to fit together as described in more detail below.

Reactor tubes 59 extend through the top wall 27S, the interior cavity 35 and through the bottom wall 29S of each reactor section. The reactor tubes 59 are arranged in a matrix of rows. For example, tubes in a single row extend parallel to the side walls. For illustration purposes, FIG. 4 shows each row having three reactor tubes. In reality, each row will have many more reactor tubes, much closer together than shown. And there may be more than two rows.

Figure 8:
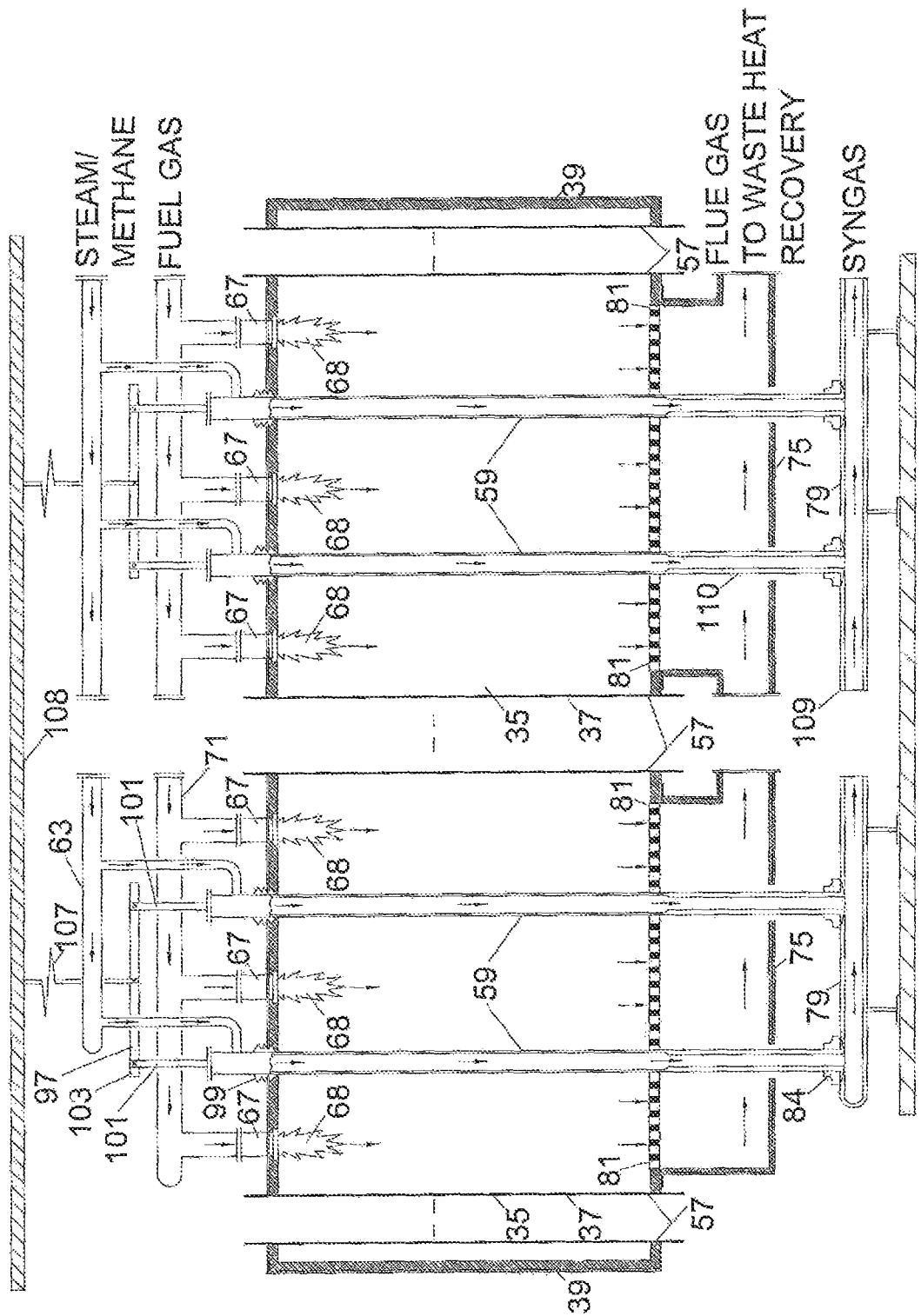
FIG. 8 is an exploded, longitudinal cross-sectional view of a steam methane reformer, in accordance with another embodiment, in operation.

The reactor tubes 59 are supported in a unique manner. Referring to FIGS. 2-4 and 8, the reactor tubes are supported from both the upper end and the lower end, and allow for expansion and contraction due to temperature changes. (FIG. 8 shows an alternative orientation of the rows of reactor tubes and rows of burners inside the reactor sections.) As the reformer is heated from ambient temperature to operating temperature, the reactor tubes 59 expand along their length. Conversely, as the reformer cools from operating temperature to ambient temperature, the reactor tubes contract along their length.

The reactor tubes 59 are fixed mounted at their lower ends 62 and flexibly mounted at their upper ends 60. As shown in FIG. 8, the upper ends 60 are flexibly mounted to a support structure located above the reformer. The support structure includes a support arm 97 located above the top wall 27 of the reformer. The support arm is connected to a reactor tube in two adjacent rows. The upper end 60 of each reactor tube passes through the top wall 27 by way of a flexible connector 99, which connector allows the tube to move along its length relative to the top wall. The upper end 60 of each reactor tube has a vertical extension member 101 that extends up and is pivotally coupled to an end portion 103 of a respective support arm. The support arm 97 has two end portions 103, with a reactor tube extension member 101 pivotally coupled to each end portion. In the preferred embodiment, the support arm is coupled to reactor tubes in different rows. For example, referring to the orientation of FIG. 8, each reactor section 37 has a left row of reactor tubes and a right row of reactor tubes. Suppose that each row in a reactor section has ten tubes, with a tube located in a first position, another tube located in a second position, a third tube located in a third position, and so on, with the tenth tube located in a tenth position. In FIGS. 2-4, the tubes in the first position of the two rows lie in a plane that is perpendicular to the side walls 31. Likewise, the tubes in the second position lie in another plane perpendicular to the side walls 31 and parallel to the plane with the first position tubes, and so on with the remaining tubes. The tubes in a particular position in a row are connected together by a respective support arm 97. Thus, there is a first support arm for the first position tubes, a second support arm for the second position tubes, and so on, with a tenth support arm for the tubes in the tenth position.

Each support arm 97 is supported from a horizontal beam 105 by a spring arrangement 107. The spring arrangement 107 can have instrumentation, such as a scale, to show a partial weight of the suspended tubes. The spring arrangement provides some resiliency to the suspended support arm.

The beam 105 is supported by columns or posts that bear on the ground adjacent to the side or end walls 31, 33 of the reformer. Alternatively, the columns or posts can hear on the framework, such as the top frame 47, the side frames 51 or the end frames 89.

The support arm 97 and spring arrangement 107 allow for differential movement in the reactor tubes 59 of the two adjacent rows. The adjacent tubes in one row likely expand and contract in unison. However, the tubes in one row may expand or contract differently that the tubes in an adjacent row. Referring to FIG. 8, if the tubes in a left row expand more than the tubes in a right row, the left end of the respective support arm 97 moves up relative to the right end, and the support arm is angled from the horizontal. If the tubes in the left and right rows expand the same amount, the respective support arm will be horizontal.

While the springs 107 support some of the weight of the reactor tubes, much of the remainder of the weight is supported by bottom structure. The bottom ends 62 of the reactor tubes 59 have flanges (not shown) located exteriorly of the bottom wall. The reactor tubes are welded to the bottom wall, but the bottom wall bears little of the weight after the reformer has been assembled on site and the catalyst has been loaded inside the reactor tubes. The bottom structure includes syngas collection pipes 79, which will be discussed in more detail below. The reactor tubes are oversized in order to bear the weight.

The reactor section, as fabricated off site, includes the reactor tubes, their bottom end flanges and the flexible connectors for the reactor tubes in the top wall. The vertical extension members 101, the support arms 97 and the springs 107 can be attached on site during the installation.

The upper ends 60 of the reactor tubes 59 are connected together by a feedstock manifold (not shown). The feedstock manifold 61 connects, for example, the tubes in a row. A feedstock supply pipe 71 extends parallel to the manifolds 61 and connects thereto. The feedstock supply pipe 71 extends in an end-to-end direction. The ends of the feedstock supply pipe 71 have flanges 65 that are co-planar with the flanges 57 of the section 37. As an alternative, the feedstock supply pipe can connect directly to the reactor tubes, without a manifold.

The top wall 27S also contains the burners 67 (See FIG. 8), which burners are located inside the interior cavity 35. The burners 67 are typically oriented in a downward direction, but may be oriented, at an angle. The burners are also located in rows, with the burner rows parallel to, and spaced between, the reactor tube rows. As shown in FIG. 8, this arrangement provides a row of burners on each side of a row of reactor tubes, thus ensuring even heating of the tubes. Thus, starting from one side wall, there is a row of burners, a row of tubes, a row of burners, and so on, with a row of burners adjacent to the other side wall.

Piping for each burner extends through the top wall to a manifold 69, which manifold is in turn connected to a fuel supply pipe 63. The fuel supply pipe is parallel to the reactor supply pipe 71 and has end flanges 65 that are co-planar to the other flanges 57, 65.

The reactor supply pipe 71 and fuel supply pipe 63 are respectively coupled to the top wall or the top wall framework by supports.

The bottom wall 29S has slots 73 for the flue gasses. The slots 73 are vertically below the burners 67. For example, one row of burners 67 extends from end 43 to end in a reactor section 37, and the corresponding slot, located below, also extends from end to end. The burners and the slot stop short of the ends 43, as there is a portion of wall therebetween.

A flue gas collection duct 75 extends the length of each of the slots 73. The ducts 75 are located exteriorly of the bottom walls 29S. Each duct has side walls that depend from the bottom wall 29S of the reactor section. A bottom duct wall closes off the bottom of the duct, extending to the side walls. Each duct has two ends, which are open. Each end is provided with a flange 77. The flue gas collection ducts 75 extend parallel to the side walls 31. In the embodiment shown in FIG. 4, there are three flue gas collection ducts 75, one for each slot. The ducts are spaced apart from each other. The syngas collection pipes 79 are located in between the ducts 75. At each end of a reactor section 37, the flanges 77 of the ducts are coplanar with each other and coplanar with the flanges 57 of the ends 43.

The interior of each duct 75 is lined with refractory slabs or brick during installation. The slots 73 are partially covered by refractory slabs 81 during installation. These flat slabs 81 are typically cast and are generally rectangular in shape. During installation, the slabs 81 are positioned over the slots 73. The slabs bear on the interior of the bottom wall 29S, The slabs are spaced apart from one another by gaps 83. The size of the gaps between adjacent slabs can vary. For example, the gaps in the center of the reactor can be small, while the gaps near the ends 43 can be larger. The gaps are sized and located so as to provide even distribution of flue gas flowing through the interior.

Referring to FIGS. 2-3 and 8, end sections 39 are shown. The end sections each have an end wall 33. The end sections each have a flange 57. The end wall and flange is sized to mate to an open end 43 and corresponding flange of a reactor section 37. The end sections each have an end frame 89 for support. In one embodiment, the end sections are flat plates or walls, wherein the flange 57 is coplanar with the end wall. In another embodiment, there is an offset between the plane with the flange and the wall, which offset is a top wall, a bottom wall, and side walls. These walls are narrow.

Figure 5:
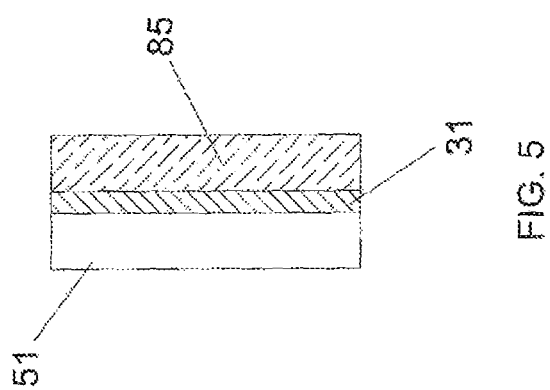
FIG. 5 is a cross-sectional view of a wall in one of the sections, taken through lines V-V of FIG. 4.
Figure 6:
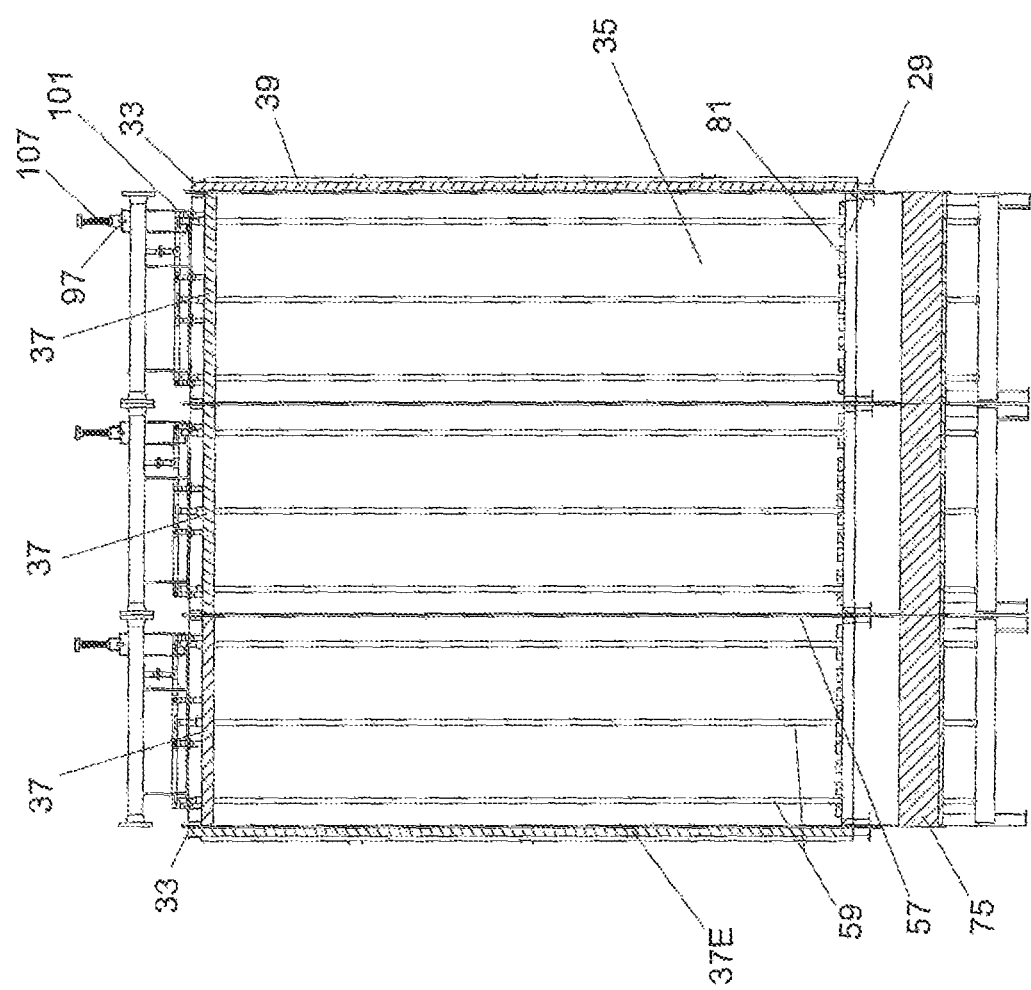
FIG. 6 is a longitudinal cross-sectional view of the assembled sectionalized box style steam methane reformer.
Figure 7:
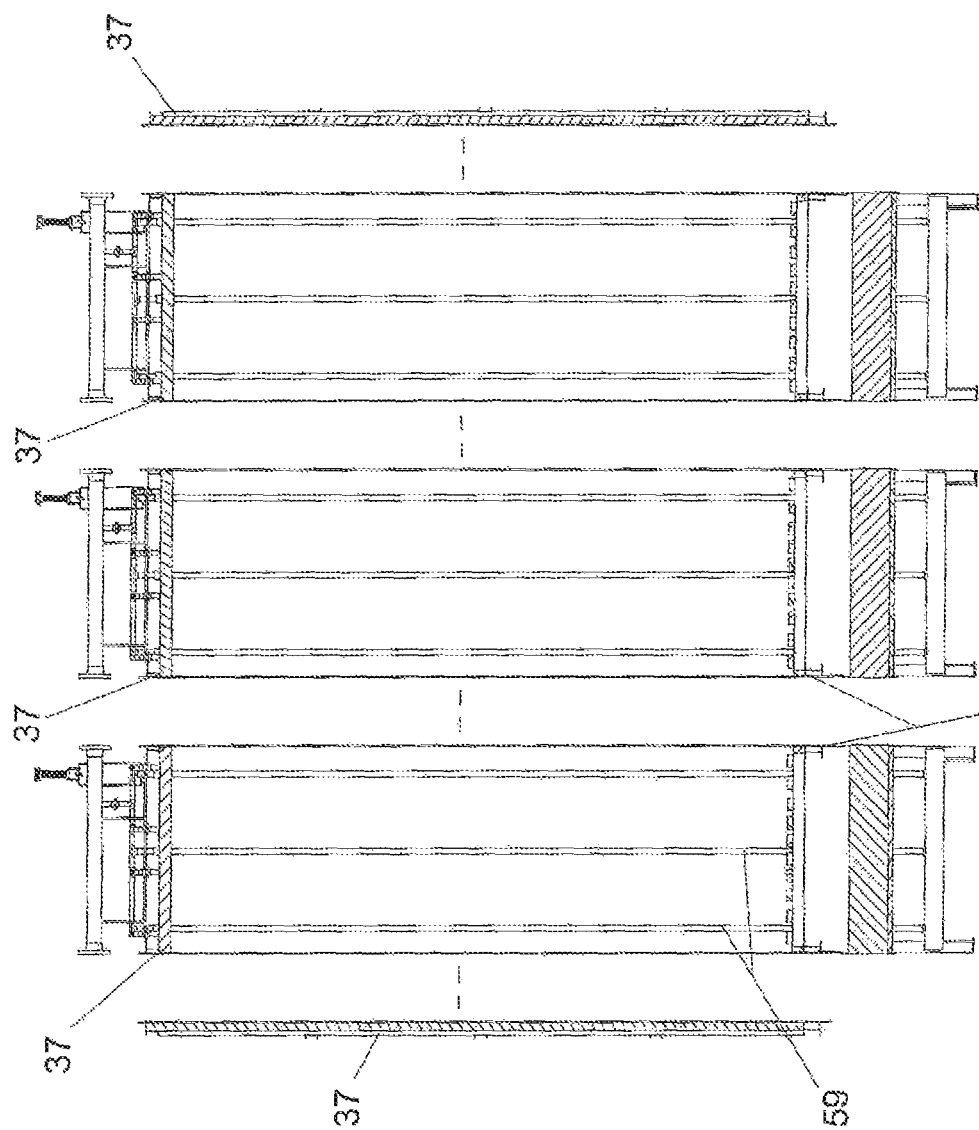
FIG. 7 is a longitudinal cross-sectional view of the exploded sectionalized box style steam methane reformer.

In all the reactor and end sections 37, 39 the interior of the walls 27, 29, 31, 33 are lined with insulation 85, such as mineral wool (see FIG. 5 as an example). Each wall thus has a metal plate, with a layer of insulation on the inside. The insulation is secured to the wall using conventional techniques. The exterior of the wall has the appropriate framework.

Each of the reactor sections 37 has legs 87 extending down from the respective bottom walls 29S to support the respective section off of the ground. The ducts 75 are also supported off of the ground.

Figure 9:
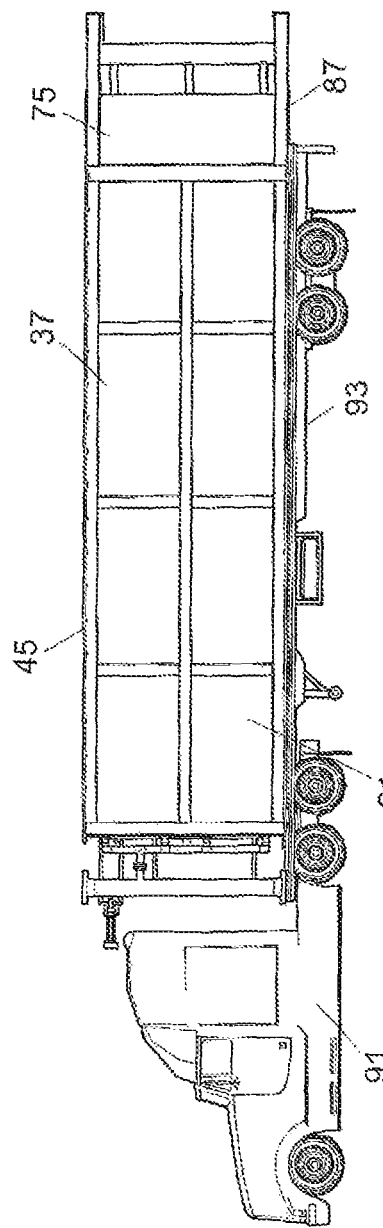
FIG. 9 is a side view of a section of the steam methane reformer transported on a vehicle.
Figure 10:
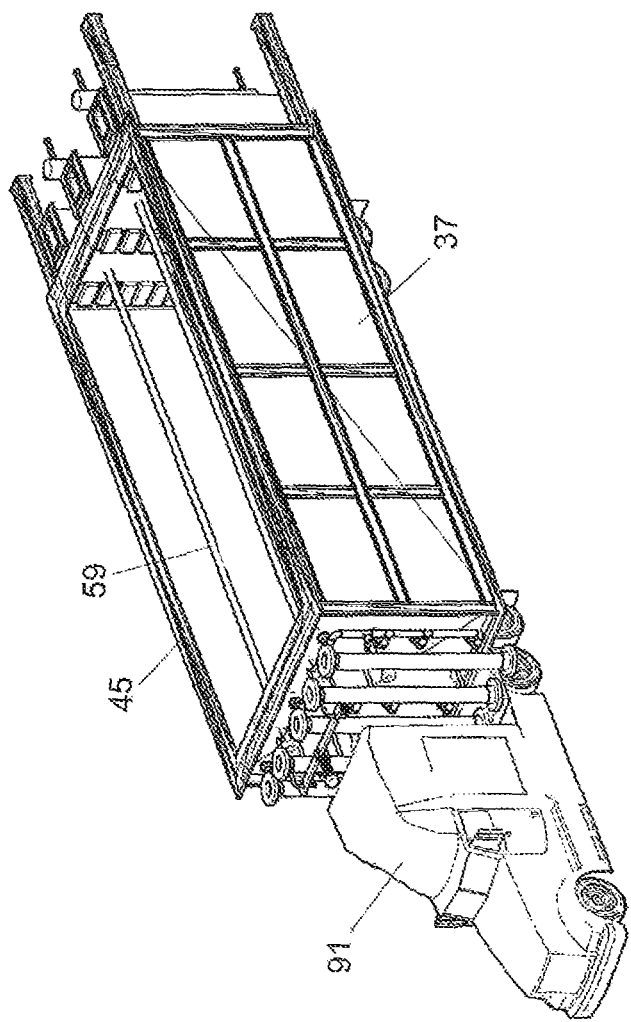
FIG. 10 is a perspective view of a section of the steam methane reformer transported on a vehicle.

The sections 37, 39 are fabricated at a fabrication shop, which shop is not at the plant 11 site, but typically located close to a population center 13. Each section is fabricated to completeness, with walls, insulation, piping all assembled and installed. The refractory slabs are left to install at the plant site. Once fabricated, each section is transported to the plant site. Transportation can be by truck 91 (tractor-trailer rig, see FIGS. 9 and 10), barge, railway car, etc. For example, a reactor section 37 is laid on a trailer 93 on one of the open ends, the other end facing up. The up facing end can be covered by plastic sheeting to prevent dirt and rain from entering. If needed, dunnage can be used to support objects, such as small diameter pipes or tubes, during transport. The section may be a standard load width (or less), or it may be an oversized load, requiring special transportation protocols. The truck travels public roads, and if need be, private roads to the plant site.

Once the sections have been transported to the plant site, assembly begins. A crane lifts each section off of its truck and tilts the section from a horizontal position to a vertical position. The sections are located on a prepared site, with the legs 87 contacting the ground.

To assemble the reactor, the reactor sections 37 are located with their open ends 43 adjacent to one another and the associated flanges in contact. The open end 43 of one reactor section 37 is placed adjacent to the open end 43 of another reactor section 37. The adjacent flanges 57 are bolted together; the flanges are provided with bolt holes. If desired, a seal can be provided between the flanges. As many reactor sections 37 are assembled together as needed for the reformer 15.

The supply pipes 63, 71 are connected together. The respective flanges 65 of the pipes are bolted together, with seals inside. The horizontal beam 105 is installed over the reactor sections and the support arms 97 and springs 107 are suspended from the beam. The ends of the support arms are attached to the extension members 101, which in turn are attached to the reactor tubes 59.

Once a section is put in location, the refractory slabs 81 are installed along the bottom wall slots 73. In addition, refractory material can line the inside of the ducts. Access to the interior is through the open ends. Alternatively, access hatches can be provided in the walls.

The ducts 75 among the reactor sections are connected together. For example, as shown in FIG. 4, there are three ducts, a left duct, a center duct and a right duct. The left ducts are connected together, the center ducts are connected together and the right ducts are connected together. The ducts are connected together at the flanges 77, which may have seals therein.

The reactor tubes bottom ends 62 are connected to the syngas collection pipes 79. The syngas collection pipes 79 are made in sections having the same length as the reactor sections end-to-end. Each syngas collection pipe has an end suitable for a butt weld joint. The syngas collection pipes 79 are fabricated with pipe connection fittings 84 at the fabrication plant off site. A typical pipe connection fitting is a branch connection fitting such as a butt weld fitting. A connection fitting is welded to the syngas collection pipe at each location that is to receive a reactor tube. The syngas collection pipe is also provided with legs 82 that support the pipe off of the ground.

The syngas collection pipes 79 are positioned under the reactor sections and under the bottom ends 62 of the reactor tubes. Each reactor tube 59 is welded to the respective fitting 84 on the respective syngas collection pipe 79. The lower ends of the reactor tubes are lined with refractory material 110 (see FIG. 8). The syngas collection pipe 79 is also provided with refractory material 109. In the preferred embodiment, the refractory material lines the inside of the tubes 59 and pipes 79.

The end sections 39 are bolted into place on the ends 43 of the reactor sections. Once assembled, the top walls 27S of the individual sections merge with one another to form the top wall 27 of the reformer. Likewise, the bottom walls 29S of the sections merge to form the bottom wall 29 of the reformer and the side walls 31S of the sections merge to form the two side walls 31 of the reformer. The individual cavities 35S of the sections merge to form the interior cavity 35 of the reformer. The reactor tubes 59 extend in rows along the length of the reformer. Likewise, the burners 67 extend in rows adjacent to and along each side of the reactor tube rows. The supply pipes, namely the feedstock supply pipe 71 and the fuel pipe 63 also extend along the length of the reformer. The ducts 75 and the syngas collection pipes 79 extend also along the length of the reformer.

The catalyst is loaded into the top end of the reactor tubes 59 at the plant site. The feed pipes and collection pipes and ducts are connected to their respective equipment. Also, the unused ends of the pipes and ducts are capped or closed.

With the reformer assembled and connected to the remainder of the plant, it can be operated in accordance with standard procedures. As shown in FIG. 8, the burners 67 combust 68 the fuel and provide heat to the interior cavity 35. The heat moves from the top of the reformer down, heating the reactor tubes 59. Each row of reactor tubes 59 has burners on each side. Thus, each row of tubes receives heat from two opposite sides. The flue gas exits the cavity into the ducts 75. The flue gas can be used to generate steam in the boiler.

Much of the weight of the reactor tubes and their contents is borne by the syngas collection pipes 79, which in turn bear on the ground. The remainder of the weight of the reactor tubes and their contents is supported by the support arms 97 and springs 107. As the reformer is heated, the reactor tubes expand upwardly. The support arms 97 and the spring arrangement 107 allow for such expansion. If the tubes in one row expand at a different rate that the tubes in an adjacent row, the support arms compensate for this, by tilting from the horizontal. Conversely, when the reformer is taken off line and allowed to cool down, the reactor tubes contract downwardly.

The feedstock flows into the reactor tubes 59 and passes over the catalyst at the desired temperature and pressure. Syngas is produced in the reactor tubes and passes out into the collection pipes 79.

The reformer can be built less expensively in sections, which sections are then assembled on site at the plant.

Alternative configurations of the sections can be used. For example, as shown in FIG. 8, the rows of reactor tubes and burners extend, not from end-to-end, but from side-to-side. The supply pipes 63, 71 and collection ducts 75 and pipes 79 extend end-to-end, or perpendicularly to the reactor tube and burner rows. Each open end of a reactor section has a row of burners adjacent thereto.

Although the preferred embodiment has been described as a box style steam methane reformers, the invention can be used on other types of box style reformers.

The foregoing disclosure and showings made in the drawings are merely illustrative of the principles of this invention and are not to be interpreted in a limiting sense.

The invention claimed is:

1. A box style steam methane reformer section, comprising:
   a) A top wall, a bottom wall, and side walls forming an interior cavity, the section having open ends that communicate with the interior cavity;
   b) At least one feedstock supply pipe located along the top wall outside of the interior cavity, the feedstock supply pipe having feedstock supply pipe ends;
   c) At least one fuel supply pipe located along the top wall outside of the interior cavity, the fuel supply pipe having fuel supply pipe ends;

d) At least one syngas collection pipe located outside of the bottom wall, the syngas collection pipe having syngas collection pipe ends;
e) At least one flue gas collection duct located outside of the bottom wall, the flue gas collection duct having flue gas collection duct ends;
f) Reactor tubes located in the interior cavity and extending from the bottom wall to the top wall, the reactor tubes having a top end connected to the feedstock supply pipe and a bottom end connected to the syngas collection pipe;
g) Burners located in the interior cavity adjacent to the top wall and being connected to the fuel supply pipe, the burners providing radiant heating of the reactor tubes;
h) The feedstock supply pipe ends, the fuel supply pipe ends, the syngas collection pipe ends and the flue gas collection duct ends being aligned with each other and with the section ends so that when the steam methane reformer section is assembled to a second steam methane reformer section, the section ends, the feedstock supply pipe ends, the fuel supply pipe ends, the syngas collection pipe ends and the flue gas collection duct ends of the steam methane reformer section, are coupled to the section ends, the feedstock supply pipe ends, the fuel supply pipe ends, the syngas collection pipe ends and the flue gas collection duct ends of the second steam methane reformer section.

2. The box style steam methane reformer section of claim 1, further comprising flanges around the section ends.

3. The box style steam methane reformer section of claim 1, further comprising flanges around the feedstock supply pipe ends, the fuel supply pipe ends, the syngas collection pipe ends and the flue gas collection duct ends.

4. The box style steam methane reformer section of claim 1, further comprising insulation inside the top wall, the bottom wall and the side waits.

5. The box style steam methane reformer section of claim 1, further comprising:
   a) at least one slot in the bottom wall, the slot aligned with the flue gas collection duct;
   b) plural refractory members located in the interior cavity and across the slot, the refractory members being separated from one another by gaps that allow the interior cavity to communicate with the flue gas collection duct.

6. The box style steam methane reformer section of claim 5, wherein the size of the gaps varies along a length of the slot from section end to section end.

7. The box style steam methane reformer section of claim 1, further comprising legs supporting the bottom wall off of the ground.

8. The box style steam methane reformer section of claim 1, further comprising:
   a) flanges around the section ends;
   b) flanges around the feedstock supply pipe ends, the fuel supply pipe ends, the syngas collection pipe ends and the flue gas collection duct ends;
   c) insulation inside the top wall, the bottom all and the side walls;
   d) at least one slot in the bottom wall, the slot aligned with the flue gas collection duct;
   e) plural refractory members located in the interior cavity and across the slot, the refractory members being separated from one another by gaps that allow the interior cavity to communicate with the flue gas collection duct;
   f) the size of the gaps varies along a length of the slot from section end to section end;
   g) legs supporting the bottom wall off of the ground.

9. A box style steam methane reformer, comprising:
   a) plural sections, each section comprising:
      i) A top wall, a bottom wall, and side walls forming an interior cavity, the respective section having open ends that communicate with the interior cavity;
      ii) At least one feedstock supply pipe located along the top wall outside of the interior cavity, the feedstock supply pipe having feedstock supply pipe ends;
      iii) At least one fuel supply pipe located along the top wall outside of the interior cavity, the fuel supply pipe having fuel supply pipe ends;
      iv) At least one syngas collection pipe located outside of the bottom wall, the syngas collection pipe having syngas collection pipe ends;
      v) At least one flue gas collection duct located outside of the bottom wall, the flue gas collection duct having flue gas collection duct ends;
      vi) Reactor tubes located in the interior cavity and extending from the bottom wall to the top wall, the reactor tubes having a top end connected to the feedstock supply pipe and a bottom end connected to the syngas collection pipe;
      vii) Burners located in the interior cavity adjacent to the top wall and being connected to the fuel supply pipe, the burners providing radiant heating of the reactor tubes;
   b) One of the ends of a first section coupled to one of the ends of a second section so as to form a continuous interior cavity between the first and second sections, with one of the feedstock supply pipe ends of the first section being coupled to the one of the feedstock supply pipe ends of the second section, one of the fuel supply pipe ends of the first section being coupled to the one of the fuel supply pipe ends of the second section, one of the syngas collection pipe ends of the first section being coupled to the one of the syngas collection pipe ends of the second section, one of the flue gas collection duct ends of the first section being coupled to one of the flue gas collection duct ends of the second section.

10. The box style steam methane reformer section of claim 9, further comprising flanges around each of the ends of the first and second sections.

11. The box style steam methane reformer section of claim 9, further comprising flanges around the feedstock supply pipe ends of each of the first and second sections, the fuel supply pipe ends of each of the first and second sections, the syngas collection pipe ends of each of the first and second sections and the flue gas collection duct ends of each of the first and second sections.

12. The box style steam methane reformer section of claim 9, further comprising insulation inside the top wall, the bottom wall and the side walls of each of the first and second sections.

13. The box style steam methane reformer section of claim 9, further comprising for each of the first and second sections:
    a) at least one slot in the bottom wall, the slot aligned with the flue gas collection duct;
    b) plural refractory members located in the interior cavity and across the slot, the refractory members being separated from one another by gaps that allow the interior cavity to communicate with the flue gas collection duct.

14. The box style steam methane reformer section of claim 13, wherein the size of the gaps varies along a length of the slot from section end to section end.

15. The box style steam methane reformer section of claim 9, further comprising for each of the first and second sections legs supporting the bottom wall off of the ground.

16. The box style steam methane reformer section of claim 9, wherein two of the sections form ends of the reformer, further comprising end sections coupled to the reformer ends, the end sections closing the interior cavity of the sections.

17. The box style steam methane reformer section of claim 9, further comprising:
   a) flanges around each of the ends of the first and second sections;
   b) flanges around the feedstock supply pipe ends of each of the first and second sections, the fuel supply pipe ends of each of the first and second sections, the syngas collection pipe ends of each of the first and second sections and the flue gas collection duct ends of each of the first and second sections;
   c) insulation inside the top wall, the bottom wall and the side walls of each of the first and second sections;
   d) for each of the first and second sections, at least one slot in the bottom wall, the slot aligned with the flue gas collection duct;
   e) for each of the first and second sections, plural refractory members located in the interior cavity and across the slot, the refractory members being separated from one another by gaps that allow the interior cavity to communicate with the flue gas collection duct;
   f) for each of the first and second sections, the size of the gaps varies along a length of the slot from section end to section end;
   g) for each of the first and second sections, legs supporting the bottom wall off of the ground.

18. A box style steam methane reformer, comprising:
   a) A top wall, a bottom wall, and side walls forming an interior cavity;
   b) At least one feedstock supply pipe located along the top wall outside of the interior cavity;
   c) At least one fuel supply pipe located along the top wall outside of the interior cavity;
   d) At least one syngas collection pipe located outside of the bottom wall;
   e) At test one flue gas collection duct located outside of the bottom wall;
   f) Burners located in the interior cavity adjacent to the top wall and being connected to the fuel supply pipe, the burners providing radiant heating of the reactor tubes;
   g) Reactor tubes located in the interior cavity, the reactor tubes being connected to the feedstock supply pipe, the reactor tubes each having a bottom end connected to the syngas collection pipe, the bottom ends of the reactor tubes being supported by the syngas collection pipe, the reactor tubes passing through the top wall and expanding and contracting with respect to the top wall.

19. The box style steam methane reformer section of claim 18, wherein the reactor tubes each have a top end that is supported by a spring suspended from an overhead structure.

20. The box style steam methane reformer section of claim 19, wherein the top ends of two of the reactor tubes are supported by an overhead support that allows for differential expansion and contraction between the two reactor tubes.

21. A box style steam methane reformer, comprising:
   a) A top wall, a bottom wall, and side walls forming an interior cavity;
   b) At least one feedstock supply pipe located along the top wall outside of the interior cavity;
   c) At least one fuel supply pipe located along the top wall outside of the interior cavity;
   d) At least one syngas collection pipe located outside of the bottom wall;
   e) At least one flue gas collection duct located outside of the bottom wall;
   f) Burners located in the interior cavity adjacent to the top wall and being connected to the fuel supply pipe, the burners providing radiant heating of the reactor tubes;
   g) Reactor tubes located in the interior cavity, the reactor tubes being connected to the feedstock supply pipe, the reactor tubes each having a bottom end connected to the syngas collection pipe;
   h) at least one slot in the bottom wall, the slot aligned with the flue gas collection duct;
   i) plural refractory members located in the interior cavity and across the slot, the refractory members being separated from one another by gaps that allow the interior cavity to communicate with the flue gas collection duct.

22. The box style steam methane reformer section of claim 21, wherein the size of the gaps varies along a length of the slot from section end to section end.

* * * * *